United States Patent [19]
Fisher

[11] Patent Number: 5,197,380
[45] Date of Patent: Mar. 30, 1993

[54] EGG BREAKING MACHINE

[76] Inventor: Patrick T. Fisher, 10251 Green Ash Rd., Dallas, Tex. 75243

[21] Appl. No.: 898,021

[22] Filed: Jun. 12, 1992

Related U.S. Application Data

[63] Continuation of Ser. No. 717,627, Jun. 19, 1991, abandoned.

[51] Int. Cl.$^5$ .............................. A23J 1/00; A23J 1/08
[52] U.S. Cl. ....................................... 99/580; 99/496; 99/568; 99/581
[58] Field of Search ........................... 99/495–500, 99/568, 580, 581; 30/120.1; D7/381, 693; 426/299, 478

[56] References Cited

U.S. PATENT DOCUMENTS

| D. 192,643 | 4/1962 | Sugaya | D7/381 |
| D. 244,119 | 4/1977 | Forrer et al. | D7/693 |
| 490,133 | 1/1893 | Berrini | 99/498 |
| 499,080 | 6/1893 | Anderson | 99/568 |
| 562,605 | 6/1896 | Hedberg | 30/120.1 |
| 962,293 | 6/1910 | Anderson | 99/568 |
| 1,409,649 | 3/1922 | Becker | 99/498 |
| 3,179,322 | 4/1965 | Larson | 30/120.1 |
| 3,958,505 | 5/1976 | Baker | 99/495 |
| 4,554,866 | 11/1985 | Hampton | 99/499 |
| 4,961,946 | 10/1990 | Shimizu | 99/568 |

FOREIGN PATENT DOCUMENTS

| 20068 | of 1908 | United Kingdom | 30/120.1 |
| 1285306 | 8/1972 | United Kingdom | 99/568 |

*Primary Examiner*—Timothy F. Simone
*Attorney, Agent, or Firm*—Hubbard, Thurman, Tucker & Harris

[57] ABSTRACT

This egg breaking machine provides a means for separating egg shell from the liquid part of the egg. The eggs (1), along with the egg holder, commonly called a filler flat, containing thirty or less eggs, are placed into the egg breaker pan (3). At one end of the pan is attached a hinge (5) that is also attached to the upper section or egg support guide (6). The egg support guide has holes (7) that allow the egg tops (8) to fit through. With the eggs and egg holder placed inside the egg breaker pan, the guide is placed down on top of the eggs exposing the top section of the eggs. Placed on top of the support guide, there is an egg cutter (12) made from a flat metal plate attached to a horizontal support beam that rotates from a connecting rod placed at the end of the pan opposite the support guide hinges.

11 Claims, 2 Drawing Sheets

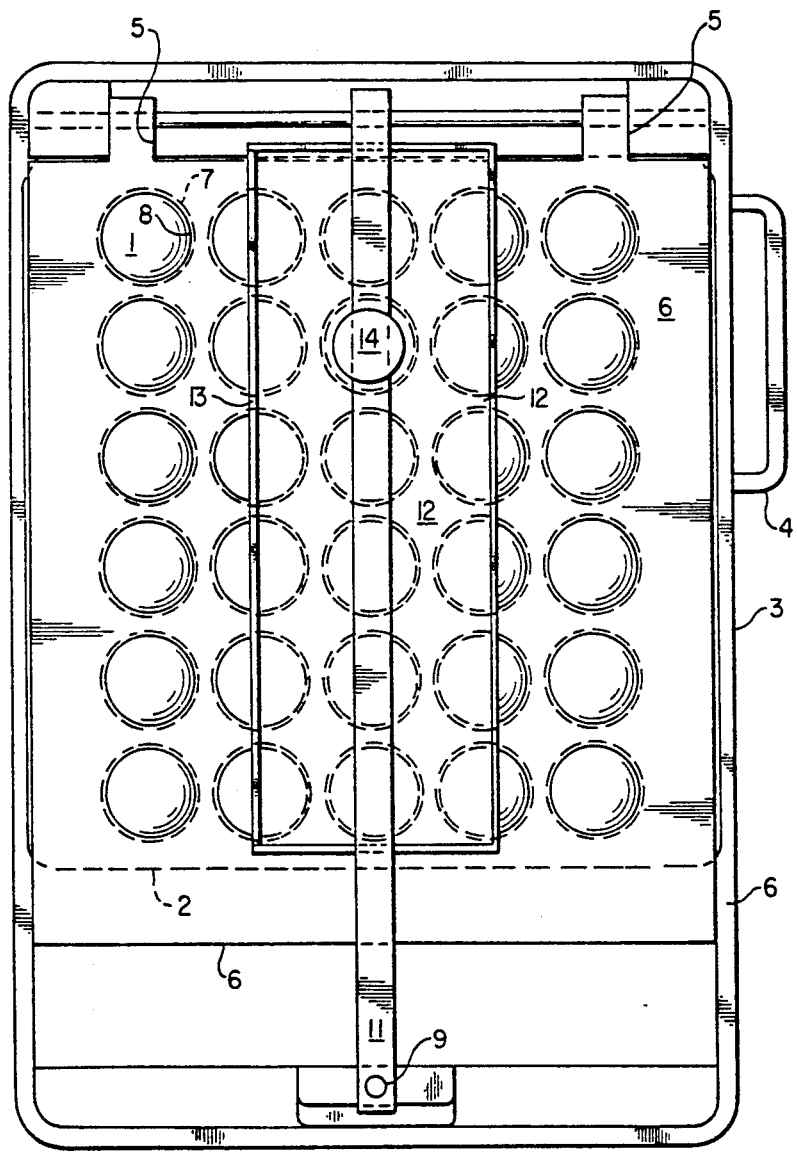
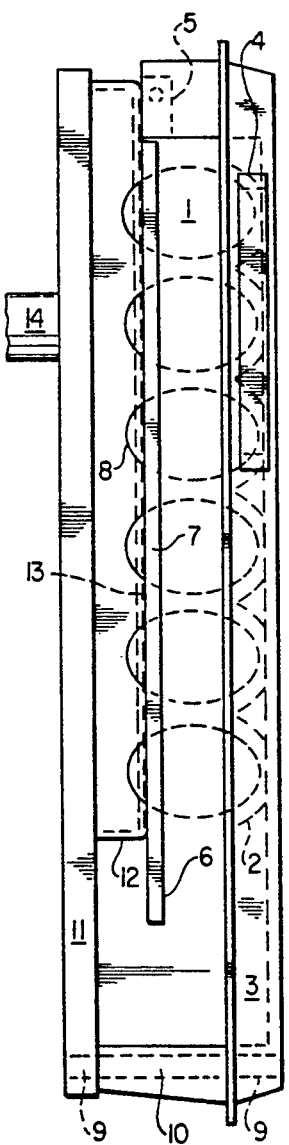
FIG. 1
FIG. 2

EGG BREAKING MACHINE

This is a continuation of application Ser. No. 07/717,627, filed on Jun. 19, 1991, now abandoned.

TECHNICAL FIELD OF THE INVENTION

The present invention relates to an egg breaking machine. In particular, the egg breaking machine allows for the breakage of a plurality of egg shells and the captive retention of the shells while the egg contents are dumped.

BACKGROUND OF THE INVENTION

Eggs are used in great quantity by commercial food operations. Restaurants typically buy eggs in cartons, or shipping flats, containing thirty eggs. These shallow cartons hold the eggs in five rows, with six eggs in each row. The egg sits within a formed indentation in the carton. The upper half of the egg is usually exposed and unprotected.

Breaking the egg's shell by hand presents several problems. First, it is a labor intensive job to remove each egg from the carton, break it, dump the contents, discard the shell, and repeat the process. Second, those cracking the eggs are subject to cuts from the broken egg shells. Therefore, a need exists for an apparatus and method of breaking an egg which addresses these problems.

SUMMARY OF THE INVENTION

The present invention relates to an egg-breaking apparatus comprising a pan with raised side portions for holding a plurality of eggs with the upper portions of the eggs extending above the raised side portions of said pan, guide means movable relative to said pan, said guide means having an upper and lower surface and a plurality of apertures formed therethrough, said guide means hingedly connected to the pan such that the upper ends of the eggs extend through said apertures and above the upper surface of said guide means, and cutting means rotatably attached to said pan to slide across the upper surface of said guide means for cutting off the upper portions of the eggs above said guide means.

DESCRIPTION OF THE DRAWINGS

For a more complete understanding of the present invention, and for further details and advantages thereof, reference is not made to the following Detailed Description taken in conjunction with the accompanying drawings, in which:

FIG. 1 is a front sectional view of the egg breaker holding an egg flat containing thirty eggs sitting inside the pan;

FIG. 2 is a side sectional view of FIG. 1;

DETAILED DESCRIPTION

Figure 4:
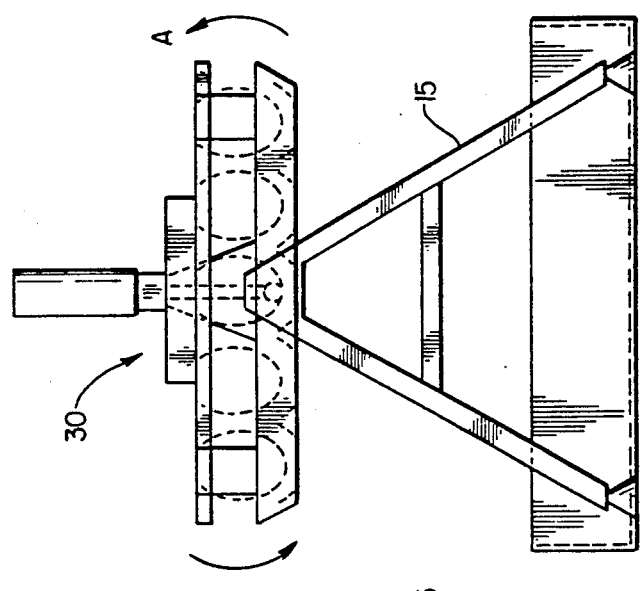
FIG. 4 provides an end view of the optional rotary design.

In FIGS. 1 and 2, there is shown the invention that is an egg breaking machine which is used for breaking thirty eggs or less at a time. Most restaurants buy eggs by the case containing thirty eggs per layer. In FIGS. 1 and 2, thirty eggs 1 are held in place by an egg holder 2 that is situated inside of a rectangular-shaped pan 3 with raised side portions. On one side of the pan, there is attached a pan handle 4 and adjacent to the pan handle is attached a hinge 5. The hinge 5 connects the pan 3 to the upper section of the rectangular-shaped egg support guide 6. The egg support guide 6 has holes 7 in it to allow the egg tops 8 to fit through. When breaking eggs 1, one of three hole sizes 7 may be used to fit the size of eggs, either small, medium or large, which are being broken. With the eggs 1 and egg holder 2 placed inside the pan 3, then the guide 6 is placed down over the egg tops 8. A connecting rod 9 is attached to pan 3 opposite the end to which the hinge 5 is attached. The rod 9 is slip fitted at one end of the pan into a hole in the cutter pivot post 10. The opposite end of the rod 9 is connected to the support beam 11.

A rectangular-shaped egg cutter 12 is attached to the support beam 11. The egg cutter 12 is made of a rectangular-shaped metal plate with an edge 13 and side walls. The egg cutter's 12 edge 13 can cut off egg tops 8. An egg cutter handle 14 can be attached to the support beam 11 opposite the egg cutter. The handle 14 is held, and the pan handle 4 is held in the other hand; then the egg cutter 12 is pushed by hand by means of handle 14 over the top of the egg support guide 6 thereby cutting off a small top section of each egg 1. The pan handle 4 can be designed to hold to the end of a table that will make it unnecessary for the operator to hold the pan handle 40 to prevent the egg breaker from sliding when in use. After a small top section of the eggs 1 have been cut off, the operator then detaches the egg cutter assembly 11, 12 and 14 from pan 3 by sliding of disconnecting support beam 11 and rod 9 from cutter pivot post 10. When placing the egg cutter assembly 11, 12 and 14 in a separate container, the egg shell tops will easily slide off the egg cutter 12. Then turning the egg breaker upside down will allow the egg yokes and whites to fall into a selected container. To prevent the yokes of each egg 1 from breaking, a utility pan can be placed firmly against the top of the support guide 6. Then the egg breaker can be turned upside down with the utility pan, and when lifting the egg breaker, the egg yokes and whites will gently fall into the utility pan.

Figure 3:
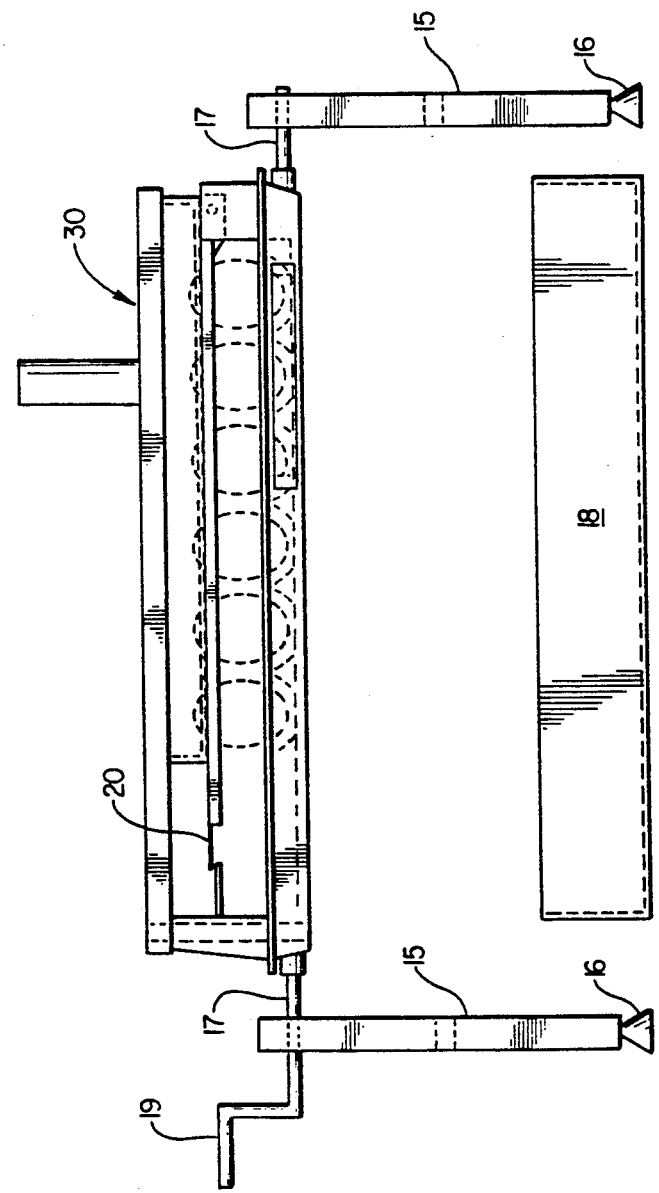
FIG. 3 provides a side view of the optional rotary design.

FIGS. 3 and 4 show a rotary feature which can be added to the egg breaking machine to facilitate each of use. The egg breaking machine is mounted between two "A" support frames 15 or like means fitted with stabilizing rubber feet or suction cups 16. Rotary support members 17 connect the "A" frames or end support means to the opposite ends of the pan 3. This rotary design feature allows easy rotation, as shown by arrow A, when "dumping" egg yokes and whites into the selected container 18. The rotary feature facilitates ease of use because the operator is no longer required to lift the egg breaking machine, but rotates the machine instead. A crank arm 19 or motor can be installed for this purpose. The egg support guide 6 is locked in place with a latch mechanism 20 attached to the cutter pivot post 10. This prevents egg shells from falling out of the egg holder 2 when rotating the egg breaking machine 180 degrees for dumping the egg yokes and whites. The egg breaking machine is then rotated another 180 degrees to its original upright starting position and becomes locked in place to begin another egg cutting cycle. The rotary feature allows the operator greater egg efficiency with less effort. Additional features will entail a complete motorized version which will automatically cut the egg shells and dump the egg yokes and whites.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such arrangements, modifications, and substitutions of parts and elements as fall within the scope of the invention.

I claim:

1. Apparatus for breaking eggs comprising:
   (a) a pan with raised side portions for holding a plurality of eggs with upper portions such that the upper portions of the eggs extend above the raised side portions of said pan,
   (b) guide means attached to said pan, said guide means having an upper and a lower surface and a plurality of apertures formed therethrough, said guide means vertically hingedly connected to the pan such that the eggs extend through said apertures and have their upper portions extend above the upper surface of said guide means, and
   (c) cutting means rotatably attached to said pan to slide across the upper surface of said guide means for cutting off the upper portions of eggs above said guide means.

2. The apparatus of claim 1 further comprising a handle attached to said cutting means.

3. The apparatus of claim 1, wherein:
   said guide means contacts the upper portions of the plurality of eggs, said guide means holding the plurality of eggs between the guide means and the pan.

4. The apparatus of claim 1 wherein:
   said guide means has a first edge hinged to said pan whereby said guide means may be pivoted next to the plurality of eggs.

5. The apparatus of claim 1 wherein said cutting means comprises a flat blade having a cutting edge for cutting off the upper portions of the eggs and side walls extending upward from the other edges of said blade to collect the egg shells cut from the upper portions of the eggs by the cutting edge.

6. The apparatus of claim 1 or 3, wherein:
   said guide means has one end hinged to one end of said support means whereby said guide means may be pivoted next to said upper end of said support means and away from said upper end of said support means,
   said cutting means comprises a flat blade having a cutting edge for cutting off the upper portions of the eggs and side walls extending upward from the other edges of said blade to collect the egg shells cut from the upper portions of the eggs by cutting edge.

7. The apparatus of claim 6 further comprises:
   said apparatus for breaking eggs is to be attached to
   (d) means to rotate said apparatus attached to opposite sides of said pan, and
   (e) a guide latch to secure said guide means in place when said pan is turned over.

8. An egg breaking machine comprising:
   (a) a pan with raised side portions for holding a plurality of eggs with an upper portion of each egg extending above the raised side portions of said pan;
   (b) guide means attached to said pan, said guide means having an upper and a lower surface and a plurality of apertures formed therethrough, said guide means hingedly connected to the pan with the eggs extending through said apertures and having their upper ends extending above the upper surface of said guide means;
   (c) cutting means rotatably attached to said pan to slide across the upper surface of said guide means for cutting off the upper portions of the eggs above said guide means; and
   (d) a handle attached to said cutting means; wherein said guide means contacts the upper portions of the plurality of eggs, said guide means holding the plurality of eggs between the guide means and the pan when said apparatus is turned over.

9. The apparatus of claim 8 wherein said guide means has a first edge hinged to said pan whereby said guide means may be vertically pivoted adjacent to the plurality of eggs in said pan.

10. The apparatus of claim 8 further comprises:
    (e) means to rotate said apparatus attached to opposite sides of said pan; and
    (f) a guide latch to secure said guide means in place when said pan is turned over.

11. The apparatus of claim 8 wherein said cutting means comprises a flat blade having a cutting edge for cutting off an upper portion of each egg and side walls extending upward from other edges of said blade to collect the egg shells cut from egg tops while said cutting means is moved in a cutting motion.

* * * * *

UNITED STATES PATENT AND TRADEMARK OFFICE
CERTIFICATE OF CORRECTION

PATENT NO. : 5,197,380
DATED : March 30, 1993
INVENTOR(S) : Patrick T. Fisher

It is certified that error appears in the above-indentified patent and that said Letters Patent is hereby corrected as shown below:

```
Col. 1, line 64, insert --30-- after "machine".
Col. 2, line 28, delete [40] and insert --4--;
        line 31, delete [of] and insert --or--;
        line 37, delete [yokes] and insert --yolks--;
        line 38, delete [yokes] and insert --yolks--;
        line 42, delete [yokes] and insert --yolks--;
        line 45, delete [each] and insert --ease--;
        line 51, delete [arrow] and insert --arrows;
        line 52, delete [yokes] and insert --yolks--;
        line 61, delete [yokes] and insert --yokes--;
        line 65, insert --breaking-- after "egg";
        line 68, delete [yokes] and insert --yolks--.
Col. 3, line 10, insert --without departing from the spirit of the
        invention.  Accordingly, the present invention is intended
        to encompass such rearrangements, modifications, and sub-
        stitutions of parts and elements-- after "elements".
Col. 3, line 48, delete [claim] and insert --claims--.
```

Signed and Sealed this

Fifth Day of April, 1994

Attest:

BRUCE LEHMAN

*Attesting Officer*  *Commissioner of Patents and Trademarks*